(12) United States Patent
Pennell et al.

(10) Patent No.: US 8,878,700 B2
(45) Date of Patent: Nov. 4, 2014

(54) AIRCRAFT MONITORING SYSTEM

(71) Applicant: The Boeing Company, Chicago, IL (US)

(72) Inventors: Sean M. Pennell, Seattle, WA (US); Noah Eric Aaron, Seattle, WA (US); Darren Gordon McDonald, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/769,674

(22) Filed: Feb. 18, 2013

(65) Prior Publication Data

US 2014/0232568 A1  Aug. 21, 2014

(51) Int. Cl.
*G01C 23/00* (2006.01)
*G08B 23/00* (2006.01)

(52) U.S. Cl.
CPC ..................................... *G08B 23/00* (2013.01)
USPC ................................ 340/973; 340/975; 701/3

(58) Field of Classification Search
USPC .................... 340/973, 975; 244/87; 701/3
See application file for complete search history.

(56) References Cited

U.S. PATENT DOCUMENTS

| | | | | |
|---|---|---|---|---|
| 4,020,324 A * | 4/1977 | Buscher et al. | ............... | 235/400 |
| 4,034,334 A * | 7/1977 | Allyn | ............................ | 340/945 |
| 4,663,627 A * | 5/1987 | Dennis | .......................... | 340/975 |
| 5,289,185 A * | 2/1994 | Ramier et al. | ................ | 340/971 |
| 6,131,055 A * | 10/2000 | Patrick | .............................. | 701/6 |
| 7,426,447 B2 | 9/2008 | Pado | | |
| 7,705,725 B2 | 4/2010 | Matsen et al. | | |
| 7,822,493 B2 | 10/2010 | Mossman et al. | | |
| 7,864,039 B2 | 1/2011 | Georgeson | | |
| 7,933,691 B2 | 4/2011 | Pitt et al. | | |
| 8,023,936 B2 | 9/2011 | Hudson et al. | | |
| 8,180,750 B2 | 5/2012 | Wilmering et al. | | |
| 8,195,346 B1 * | 6/2012 | Duerksen et al. | ............... | 701/15 |
| 8,423,206 B2 * | 4/2013 | Shapiro et al. | ..................... | 701/3 |
| 8,437,904 B2 | 5/2013 | Mansouri et al. | | |
| 8,451,144 B2 * | 5/2013 | Ishihara et al. | ............... | 340/969 |
| 2006/0284021 A1 * | 12/2006 | A'Harrah | ...................... | 244/195 |
| 2009/0182515 A1 | 7/2009 | Pado et al. | | |
| 2010/0131238 A1 | 5/2010 | Boldrin et al. | | |
| 2011/0087387 A1 | 4/2011 | Safa-Bakhsh et al. | | |
| 2012/0044092 A1 | 2/2012 | Shore et al. | | |
| 2012/0277933 A1 | 11/2012 | Krogh et al. | | |
| 2013/0026287 A1 | 1/2013 | Goupil et al. | | |
| 2013/0044155 A1 | 2/2013 | Duce et al. | | |
| 2013/0046714 A1 | 2/2013 | Harris | | |
| 2013/0079955 A1 | 3/2013 | Masiello et al. | | |

OTHER PUBLICATIONS

Extended European Search Report, dated Aug. 1, 2014, regarding Application No. EP14153856, 10 pages.

Fen et al., "Anti-windup controller design using linear parameter-varying control methods," International Journal of Control, vol. 73, No. 12, Aug. 2000, pp. 1104-1114.

\* cited by examiner

*Primary Examiner* — Brent Swarthout

(74) *Attorney, Agent, or Firm* — Yee & Associates, P.C.

(57) ABSTRACT

A method and apparatus for monitoring an aircraft. A pilot control input signal is received. A response of a control surface system controlled by a flight control model is identified using the pilot control input signal. An alert is generated when the control surface system reaches a threshold with respect to the control surface system becoming saturated.

27 Claims, 11 Drawing Sheets

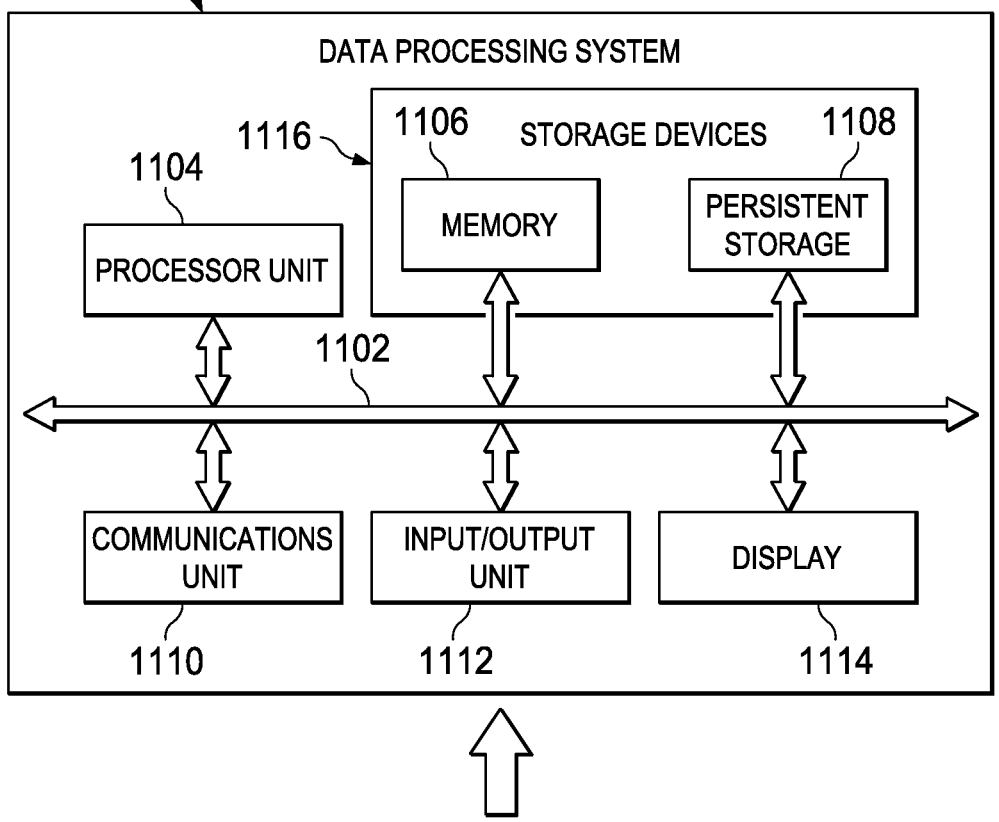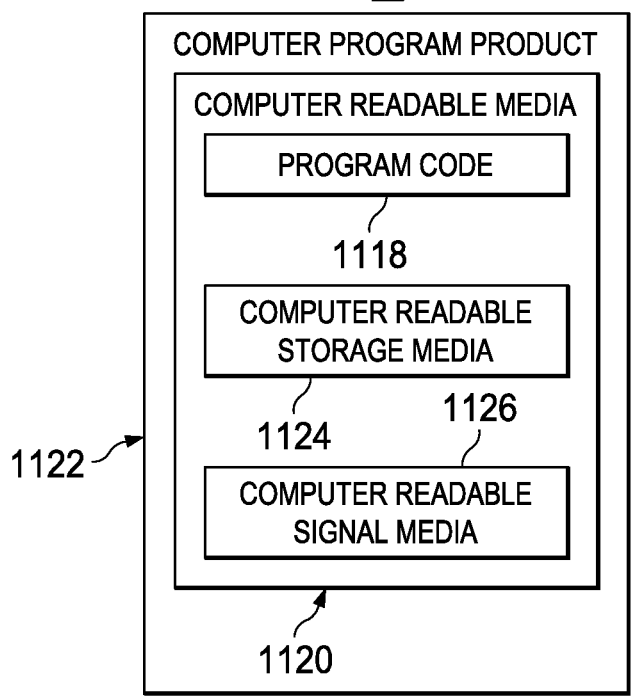

AIRCRAFT MONITORING SYSTEM

BACKGROUND INFORMATION

1. Field

The present disclosure relates generally to aircraft and, in particular, to monitoring the flight of an aircraft. Still more practically, the present disclosure relates to a method and apparatus for providing awareness of the state of an aircraft during testing of the aircraft.

2. Background

When an aircraft is developed, testing is conducted as part of the development of the aircraft. Flight testing is completed to gather data about the performance of the aircraft during the flight of the aircraft. This data may be used to evaluate the aircraft. For example, the data may be used to validate the performance of a particular design for the aircraft.

Additionally, the data may be used to determine whether the aircraft flies as desired and provides a desired level of safety. The flight tests also may be used to certify an aircraft with respect to safety and performance requirements of a particular government entity.

During the flight test, the pilot manipulates controls to perform different maneuvers. The manipulation of controls may change the positioning of control surfaces for the aircraft. As the flight test progresses, the pilots may cause the control surfaces to move toward the limits of the control surfaces.

For example, the pilots may manipulate the controls to change the pitch of the aircraft. The change in pitch may become progressively more aggressive during the flight test or over different flight tests. This change in pitch may cause the control surfaces to reach a limit. When the limit is reached, the aircraft may not perform as desired or as expected.

Many currently used flight control systems have controls in the cockpit that are mechanically connected to control surfaces in the aircraft. These controls are often connected to the control surfaces by linkages, cables, and other mechanical components. With this type of flight control system, when a control in the cockpit is moved to a limit, the control surface also reaches a limit of movement. In this manner, the pilot is able to tell when a control surface has reached a limit as to how far the control surface can be manipulated. In other words, when a limit in a control surface is reached, the control corresponding to that particular control surface may no longer be manipulated.

In performing flight testing, it is often undesirable to reach the limit for moving the control surface during a maneuver early in the process of flight testing the aircraft. As a result, the pilot may be able to move a control surface toward the limit but avoid reaching the limit during testing and normal flight.

Testing of aircraft with flight control systems in the form of fly-by-wire systems may be more difficult than testing with mechanical control systems. A fly-by-wire control system replaces the manual flight control found with mechanical systems with an electronic interface.

Thus, when the pilot moves a control in the cockpit, this movement of the control is converted into signals transmitted over wires, optical fibers, or other types of communications links. These signals are interpreted by a computer in the aircraft as a commanded aircraft response. In turn, the computer generates signals that are sent to the flight control surfaces to effect the commanded aircraft response. These signals are sent to devices, such as actuators, associated with the flight control surfaces.

As a result, the pilots may not have a feel for the actual position of a flight control surface based on the position of the pilot control. Consequently, flight testing of an aircraft using a fly-by-wire control system may be more difficult when trying to avoid limits for flight control surfaces. Therefore, it would be desirable to have a method and apparatus that takes into account at least some of the issues discussed above, as well as other possible issues.

SUMMARY

In one illustrative embodiment, a method for monitoring an aircraft is presented. A pilot control input signal is received. A response of a control surface system controlled by a flight control model is identified using the pilot control input signal. An alert is generated when the control surface system reaches a threshold with respect to the control surface system becoming saturated.

In another illustrative embodiment, a method for monitoring an aircraft is presented. A pilot control input signal is received. A response of a control surface system controlled by a flight control model is identified using the pilot control input signal. A display of the response of the control surface system is modified based on a range for a position of the control surface system.

In yet another illustrative embodiment, an apparatus comprises a flight monitor. The flight monitor is configured to receive a pilot control input signal for an aircraft and identify a response of a control surface system controlled by a flight control model using the pilot control input signal. The flight monitor is further configured to generate an alert when the control surface system reaches a threshold with respect to the control surface system becoming saturated.

In still another illustrative embodiment, an apparatus comprises a flight monitor. The flight monitor is configured to receive a pilot control input signal for an aircraft and identify a response of a control surface system controlled by a flight control model using the pilot control input signal. The flight monitor is further configured to modify a display of the response of the control surface system based on a range for a position of the control surface system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a block diagram of a data processing system in accordance with an illustrative embodiment.

DETAILED DESCRIPTION

Figure 1:
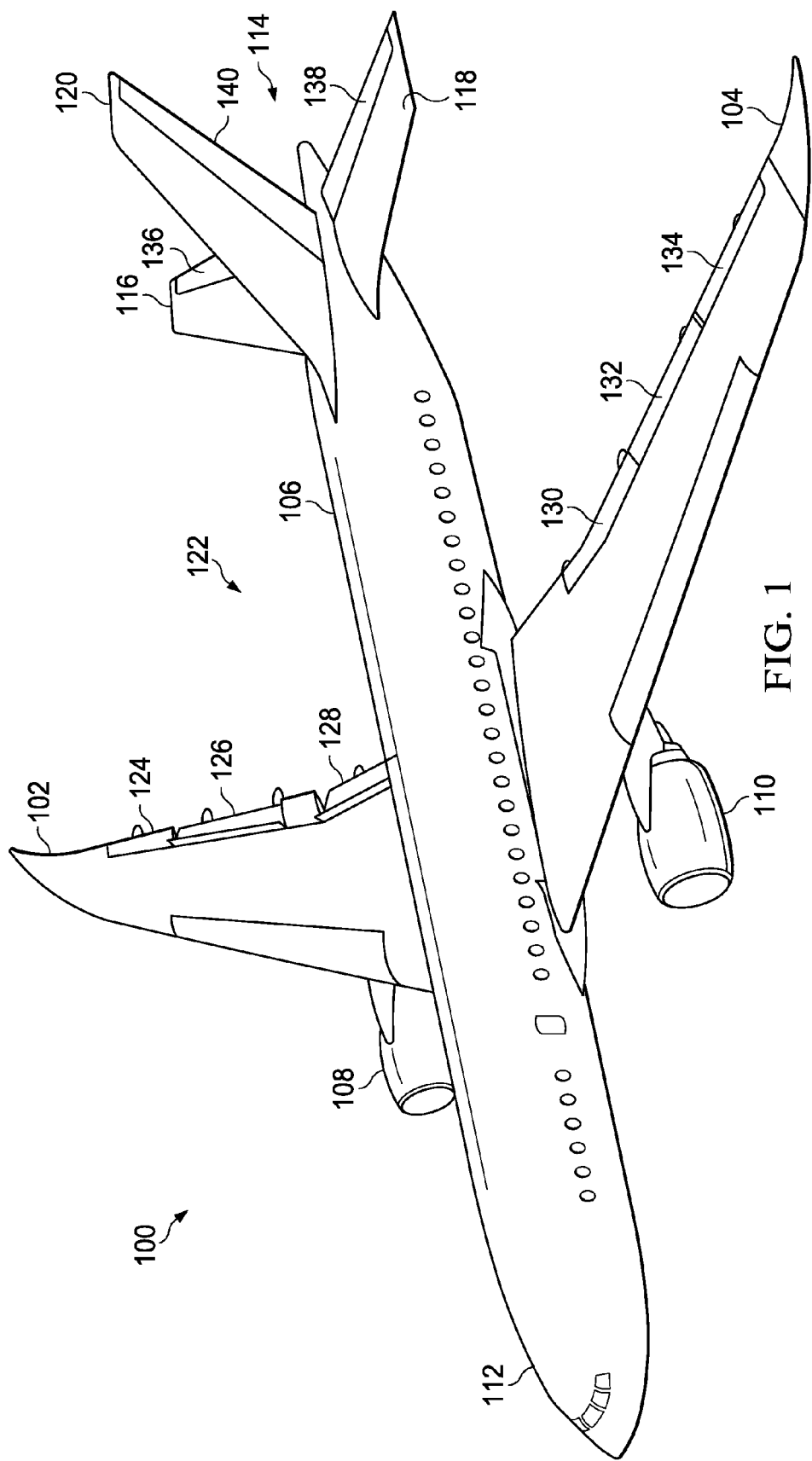
FIG. 1 is an illustration of an aircraft in accordance with an illustrative embodiment.

The illustrative embodiments recognize and take into account one or more different considerations. For example, the illustrative embodiments recognize and take into account that controls in an aircraft with a fly-by-wire control system may not provide a desired amount of feedback. For example, unlike in a mechanical control system, the fly-by-wire control system may not indicate when physical limits of the position of a control surface are approached or reached.

The illustrative embodiments also recognize and take into account that a fly-by-wire control system may include augmentations. For example, software, such as control laws, may be used to predict the desired result from moving controls in the control system. The software may generate commands to the control surface that cause the control surface to move more or less than may be indicated by the position of the control manipulated by the pilot. A limit based on software may be referred to as a control limit.

As a result, this type of augmentation of a fly-by-wire control system may further increase the difficulty in knowing when a physical limit to the movement of a control surface is approached or reached. In other words, the software may set limits to the movement of the control surface in addition to the actual mechanical limits of the control surface. As a result, limits of movement of the control surface may be based on the actual ability of the control surface to move to a particular position, as well as the ability of the control surface to move based on the software.

Thus, the illustrative embodiments provide a method and apparatus for monitoring an aircraft. In particular, the illustrative embodiments may be used to monitor an aircraft with a fly-by-wire control system.

In one illustrative example, a pilot control input signal is received. A response of a control surface system controlled by a flight control model is identified using the pilot control input signal. An alert is generated when the control surface system reaches a threshold with respect to the control surface system becoming saturated. In other words, the alert may be a response indicating that the control surface system is approaching a full deflection capability for the control surface system With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

Aircraft 100 is an example of an aircraft in which a flight monitor may be implemented in accordance with an illustrative embodiment. The flight monitor may be implemented in aircraft 100 to monitor control surfaces 122 on aircraft 100. This monitoring of control surfaces 122 may include the position of control surfaces 122 on aircraft 100. A flight monitor also may monitor movement for maneuvers by aircraft 100. For example, the flight monitor may monitor a roll performed by aircraft 100.

As depicted, control surfaces 122 include control surfaces such as aileron 124, aileron 126, aileron 128, aileron 130, aileron 132, and aileron 134. Control surfaces 122 also may include, for example, elevator 136, elevator 138, and rudder 140. Of course, these are only examples of some types of main control surfaces for aircraft 100. Aircraft 100 may include other control surfaces such as, for example, without limitation, spoilers, air brakes, slats, control tabs, and other suitable types of control surfaces that may be used to control the movement of aircraft 100.

Although aircraft 100 is shown in the form of a commercial airplane, the different illustrative embodiments may be applied to other types of aircraft. For example, the illustrative embodiments may be applied to military airplanes, rotorcraft, and other suitable types of aircraft.

Figure 2:
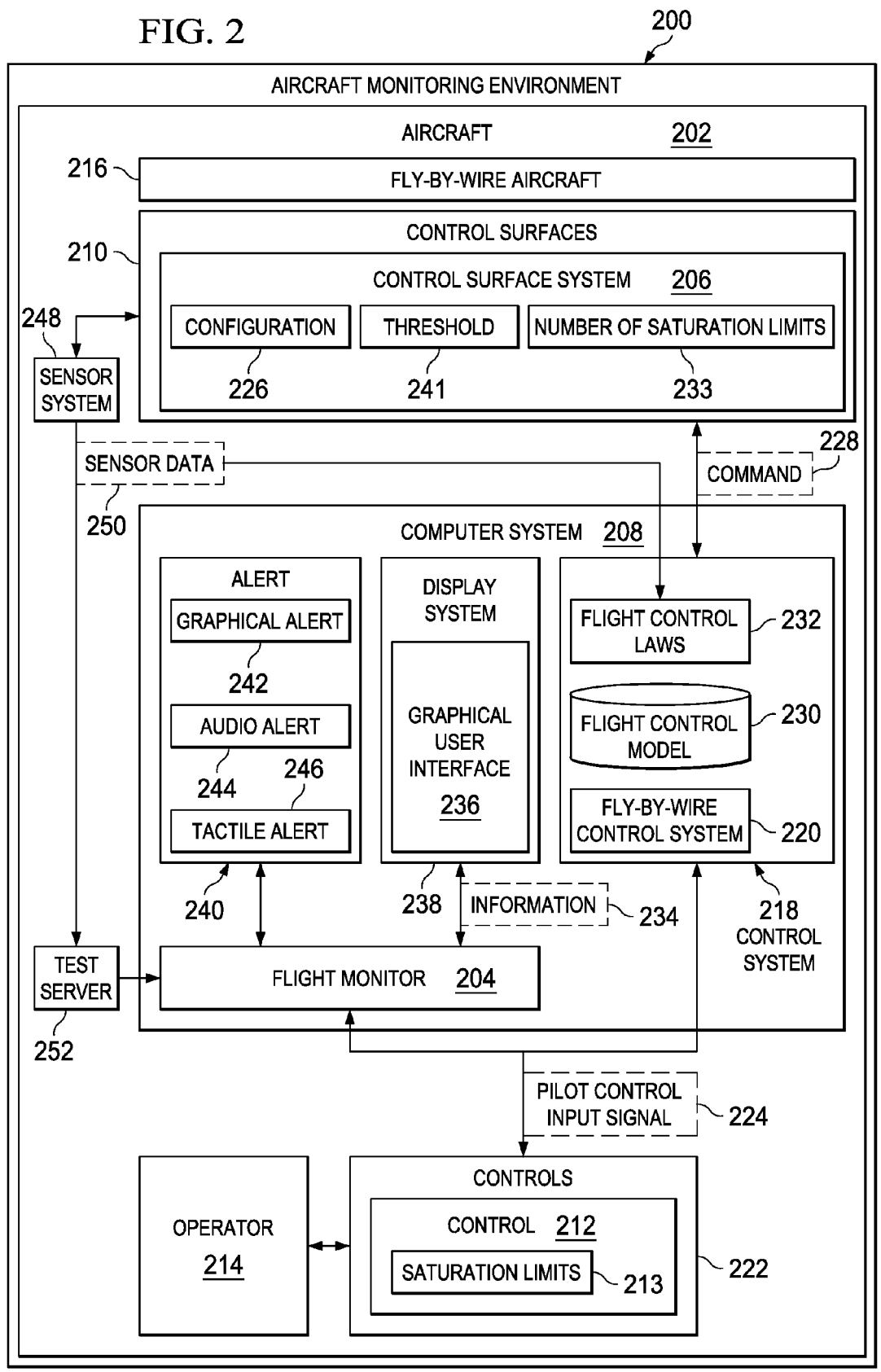
FIG. 2 is an illustration of a block diagram of an aircraft monitoring environment in accordance with an illustrative embodiment.

With reference next to FIG. 2, an illustration of a block diagram of an aircraft monitoring environment is depicted in accordance with an illustrative embodiment. In this depicted example, aircraft monitoring environment 200 is an environment in which the performance of aircraft 202 may be monitored. Aircraft 100 in FIG. 1 is an example of one implementation for aircraft 202.

In this illustrative example, flight monitor 204 is configured to monitor control surface system 206. As depicted, flight monitor 204 may be implemented in software, hardware, firmware, or a combination thereof. When software is used, the operations performed by flight monitor 204 may be implemented in program code configured to run on a processor unit. When firmware is used, the operations performed by flight monitor 204 may be implemented in program code and data and stored in persistent memory to run on a processor unit. When hardware is employed, the hardware may include circuits that operate to perform the operations in flight monitor 204.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, flight monitor 204 may be implemented in computer system 208 in aircraft 202. Computer system 208 is one or more computers in these illustrative examples. When more than one computer is present in computer system 208, those computers may communicate with each other using a communications medium such as a network.

In these depicted examples, control surface system 206 is control surfaces 210 associated with aircraft 202. In other words, control surface system 206 includes one or more control surfaces in control surfaces 210.

Control surfaces 210 in control surface system 206 are comprised of one or more control surfaces that move in response to manipulation of control 212 by operator 214. Control surface system 206 may be, for example, a roll control surface system, a yaw control surface system, a pitch control surface system, or some other suitable type of control surface system.

Control 212 may take a number of different forms. For example, control 212 may be selected from one of a wheel, a column, a pedal, a joystick, a lever, or some other suitable control that may be manipulated by operator 214 in controlling the configuration or movement of aircraft 202.

Control 212 has one or more saturation limits 213. In these illustrative examples, saturation limits 213 for control 212 are physical limits. Saturation limits 213 may or may not be constant for all flight conditions and configurations of aircraft 202.

In this illustrative example, control 212 does not directly manipulate control surface system 206. As depicted, aircraft 202 takes the form of fly-by-wire aircraft 216. In other words, aircraft 202 has control system 218 in the form of fly-by-wire control system 220.

Control system 218 is an interface for controls 222, including control 212, to operate control surfaces 210. In these illustrative examples, control system 218 may be implemented using software, hardware, or some combination thereof. Control system 218 also may be implemented within computer system 208 in these illustrative examples.

In these depicted examples, operator 214 may generate pilot control input signal 224 by manipulating control 212 in controls 222. Pilot control input signal 224 may be received by flight monitor 204. In these illustrative examples, pilot control input signal 224 may be generated by a control located in one of aircraft 202 and a simulator for aircraft 202.

In this illustrative example, pilot control input signal 224 indicates the manipulation of control 212 performed by operator 214. For example, pilot control input signal 224 may indicate a change in position of control 212 and other suitable types of information depending on the particular implementation.

Control system 218 is configured to control configuration 226 of control surface system 206 using pilot control input signal 224 generated by control 212 in response to manipulation of control 212 by operator 214. In other words, control system 218 may send command 228 to control surface system 206 to cause changes in the position of a control surface in control surface system 206. In these illustrative examples, command 228 may cause one or more actuators associated with control surface system 206 to change the position of the control surface. In some cases, more than one control surface may be moved if control surface system 206 includes more than one control surface.

In these illustrative examples, control system 218 interprets pilot control input signal 224 as a commanded aircraft response. Control system 218 uses flight control model 230 to identify command 228 that will cause a predicted aircraft response that matches the commanded aircraft response. Flight control model 230 uses the current aircraft configuration and flight conditions to determine command 228 that will result in the commanded aircraft response.

As depicted, flight control laws 232 monitor sensor data 250 to determine the error between commanded aircraft response and actual aircraft response. Flight control model 230 then adjusts command 228 to reduce the aircraft response error to zero.

In these illustrative examples, flight control laws 232 interpret pilot control input signal 224 as a commanded aircraft response in generating command 228. As a result, configuration 226 for control surface system 206 may be different than expected by operator 214 based on the manipulation of control 212.

For example, if control 212 is a column, operator 214 may move the column such that the column does not reach the limit of movement for the column. However, control system 218 using flight control laws 232 and flight control model 230 may generate command 228 that causes an elevator in control surface system 206 to move to the physical limit of the elevator. In other words, flight control laws 232 may cause the control surface to move up to the physical limit and remain there in an attempt to reduce the response error.

In the illustrative examples, control system 218 may use flight control model 230 to generate command 228 even if pilot control input signal 224 is zero. In other words, control system 218 may automatically perform functions without input from a pilot. For example, control system 218 may generate command 228 to eliminate the response error.

In these illustrative examples, control surface system 206 may have number of saturation limits 233. As used herein, a "number of" when used with reference items means one or more items. For example, number of saturation limits 233 is one or more saturation limits.

A saturation limit in number of saturation limits 233 is a physical limit to the movement of a control surface in control surface system 206. The saturation limit may be mechanically-based as a physical limit of the ability of the control surface to move. In other words, the saturation limit may be defined by the design of the control surface. The saturation limit also may be process or software based. In this case, the design of the control surface may allow it to move further, but movement may be limited by a process or software. These limits may indicate a full deflection capability for one or more control surfaces.

In this illustrative example, a saturation limit may be set by control system 218. More specifically, flight control laws 232 may generate a limit less than the physical limit which a control surface can move to form a saturation limit within number of saturation limits 233.

As depicted, flight monitor 204 is configured to provide information 234 about configuration 226 of control surfaces 210 in control surface system 206. In these illustrative examples, information 234 may be provided by displaying information 234 in graphical user interface 236 in display system 238 of computer system 208. Display system 238 is hardware and may include one or more display devices.

In these illustrative examples, flight monitor 204 may generate alert 240. Alert 240 may be generated when control surface system 206 reaches threshold 241. As depicted, threshold 241 is with respect to control surface system 206 becoming saturated. In other words, threshold 241 may be reached before a saturation limit is reached in number of saturation limits 223 associated with threshold 241.

In these illustrative examples, threshold 241 may be selected in a number of different ways depending on the particular implementation. For example, threshold 241 may be a percentage of when control surface system 206 reaches saturation, a value, the actual point at which control surface system 206 reaches saturation, or some other suitable measure.

In these illustrative examples, control surface system 206 reaching saturation is an undesired situation. When control surface system 206 reaches saturation, control surface system 206 may not operate to control movement of aircraft 202 in a desired manner. As a result, aircraft 202 may move in an undesired manner. For example, aircraft 202 may perform a maneuver more slowly than desired, perform an undesired maneuver, or engage in some other type of undesired or unexpected movement.

As depicted, control surface system 206 may be mechanically saturated when one or more control surfaces in control surface system 206 reaches a physical limit with respect to movement of the control surface. This physical limit may be based on the design of the control surface, a limit set by control system 218, or some combination thereof. As a result, the control surface is unable to be positioned in a manner that provides the amount of force needed to reduce the aircraft response error of aircraft 202 in a desired manner.

In these illustrative examples, number of saturation limits 233 may vary dynamically. In other words, number of saturation limits 233 may vary during flight of aircraft 202. Number of saturation limits 233 may vary based on a number of different conditions. These conditions may include, for example, at least one of a phase of flight, altitude, yaw angle, gross weight, flap setting, gear position, speed of aircraft 202, and other suitable conditions.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination items and number of items may be used from the list but not all of the items in the list are required.

Further, control surface system 206 may be considered to be saturated as a system even though one or more other control surfaces may not be saturated. This condition may occur when control surface system 206 is unable to provide the force necessary to control movement of aircraft 202 as desired even though some of the control surfaces still may change position to exert the force.

In other words, some of the control surfaces may be able to exert force desired to control movement of aircraft 202 in the desired manner. As a result, control surfaces 210 in control surface system 206 are unable to provide the needed force to control movement of aircraft 202 in a desired manner.

In these illustrative examples, alert 240 may take various forms. For example, alert 240 may be selected from at least one of graphical alert 242, audio alert 244, tactile alert 246, or other suitable types of alerts. Graphical alert 242 may be displayed on graphical user interface 236 in display system 238. Audio alert 244 may be generated on a sound system (not shown). Tactile alert 246 may be provided on control 212 and may be, for example, a vibration or some other suitable tactile cue.

In these depicted examples, information 234 about configuration 226 of control surfaces 210 in control surface system 206 may be obtained from sensor system 248. Sensor system 248 is associated with control surfaces 210 to monitor control surfaces 210 and is configured to generate sensor data 250. The configuration of control surfaces 210 includes configuration 226 of control surface system 206.

Sensor system 248 also may be associated with other systems in aircraft 202. For example, sensor system 248 may be associated with engines, auxiliary power units, hydraulic systems, or other components in aircraft 202.

In this illustrative example, sensor data 250 may be received by flight monitor 204 through test server 252. Test server 252 may be configured to receive and process sensor data 250. Test server 252 may process sensor data 250 such that flight monitor 204 may receive sensor data 250 as quickly as possible. For example, flight monitor 204 may receive sensor data 250 in real time.

As depicted, test server 252 also may process sensor data 250 to place sensor data 250 in a format used by flight monitor 204. Test server 252 may be installed specifically for flight testing, as part of a health monitoring system, or some combination thereof depending on the particular implementation.

Figure 3:
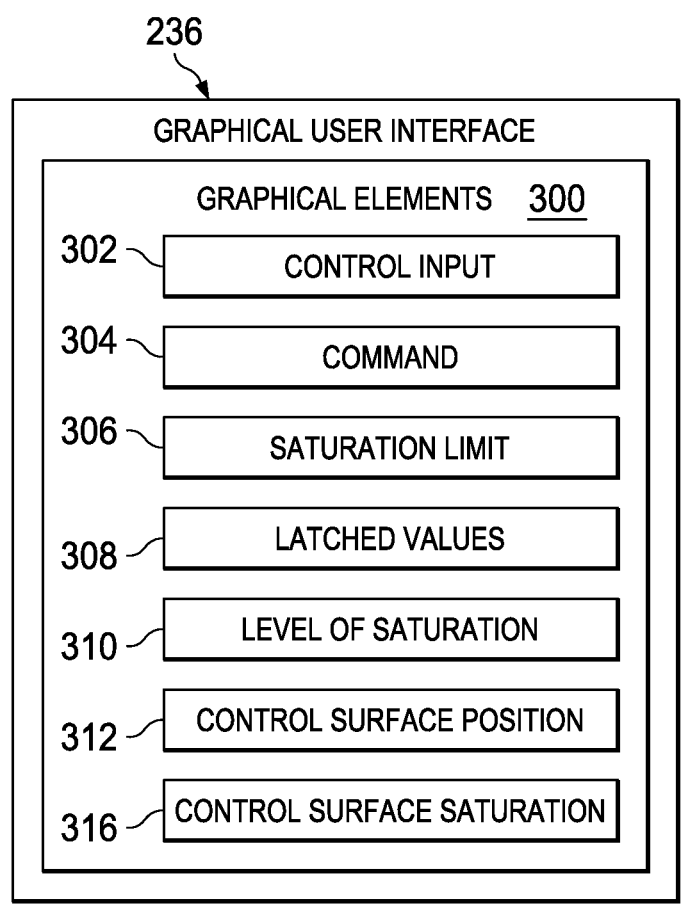
FIG. 3 is an illustration of a block diagram of a graphical user interface in accordance with an illustrative embodiment.

Turning next to FIG. 3, an illustration of a block diagram of a graphical user interface is depicted in accordance with an illustrative embodiment. In this figure, illustrations of features that may be present in graphical user interface 236 in FIG. 2 are shown.

As depicted, graphical user interface 236 includes graphical elements 300. These graphical elements may take various forms. For example, a graphical element in graphical elements 300 may be selected from at least one of a bitmap, an image, a color, a font type, a font size, shading, crosshatching, or other suitable types of elements.

In these depicted examples, graphical elements 300 may be used to indicate information 234 in FIG. 2 on graphical user interface 236. For example, graphical elements 300 may be used to display information 234 in the form of at least one of control input 302, command 304, saturation limit 306, latched values 308, level of saturation 310, control surface position 312, control surface saturation 316, or other suitable information.

As depicted, control input 302 is the input generated by operator 214 on control 212 in FIG. 2. Control input 302 may be a visual representation of pilot control input signal 224 in FIG. 2 in these illustrative examples.

Command 304 is command 228 by control system 218 in FIG. 2. As depicted, command 304 is a visual representation of command 228 sent to control surface system 206 in FIG. 2.

As depicted, saturation limit 306 is a limit for a particular control surface or group of control surfaces. In other words, saturation limit 306 may be used to indicate the extent of at least one of control input 302 and command 304. Saturation limit 306 may be one based on the mechanical design of a control surface, one based on a limit set by the control system, or some combination thereof.

In this illustrative example, these limits may be displayed in a modified fashion. In other words, a graphical element for saturation limit 306 may stay constant even though the value for saturation limit 306 may change. The display may be modified based on a predetermined range.

Latched values 308 are at least one of maximum values and minimum values. Latched values 308 are for at least one of control input 302 and command 304.

Level of saturation 310 identifies a level of saturation for control surface system 206 in FIG. 2. Level of saturation 310 may indicate how close control surface system 206 is to saturation.

In these illustrative examples, graphical elements 300 provide situational awareness to a pilot. This situational awareness may be provided such that each of graphical elements 300 moves in an intuitive sense and form. In other words, situational awareness may be provided by graphical elements 300 when graphical elements 300 move in a logical fashion and provide information that the pilot may easily view and understand. For example, situational awareness may be enhanced when lateral parameters of aircraft 202 are graphically displayed in a circular fashion, with clockwise movement of graphical elements 300 matching clockwise movement of the aircraft 202.

Of course, situational awareness may be provided to the pilot by arranging graphical elements 300 in some other fashion, depending on the particular implementation. In other illustrative examples, situational awareness also may be enhanced by providing additional data such as flight control mode, aircraft configuration, flight envelope, and other suitable types of data.

Additionally, graphical elements 300 also may provide data integrity for the pilot. For example, data integrity is continuously monitored and indicated in each section of the graphical user interface using graphical elements 300. As an example, if the data displayed in the graphical user interface is determined to be invalid, then one of graphical elements 300 may be displayed as a muted grey. In other illustrative examples, an indication that the data is invalid may be displayed on the graphical user interface in some other suitable manner, depending on the particular implementation.

The presentation of information 234 in graphical user interface 236 using graphical elements 300 may be configured to provide operator 214 with information 234 about aircraft 202. In particular, graphical elements 300 may be used to provide situational awareness of control surfaces 210 and, in particular, control surface system 206 that may be of interest for a particular maneuver. Thus, one or more illustrative embodiments may provide an ability to perform at least one of monitoring for saturation in a control surface system, displaying information about control surfaces, displaying information about control surface saturation, or providing other information that may be used to provide a pilot situational awareness, safety monitoring, and other desirable information.

The illustration of aircraft monitoring environment 200 and the different components in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the operation of control system 218 has been described as generating command 228 in response to receiving pilot control input signal 224 in the illustrative example. In other illustrative examples, one or more additional pilot control input signals may be generated in addition to pilot control input signal 224. Further, control system 218 may generate one or more commands in addition to command 228 in response to pilot control input signal 224 or additional pilot control input signals.

Further, graphical elements 300 are only examples of graphical elements that may be used in graphical user interface 236. Multiple instances of these different types of graphical elements may be displayed in graphical user interface 236 depending on the particular implementation. Moreover, other types of graphical elements also may be included in addition to or in place of ones depicted in FIG. 3.

Figure 4:
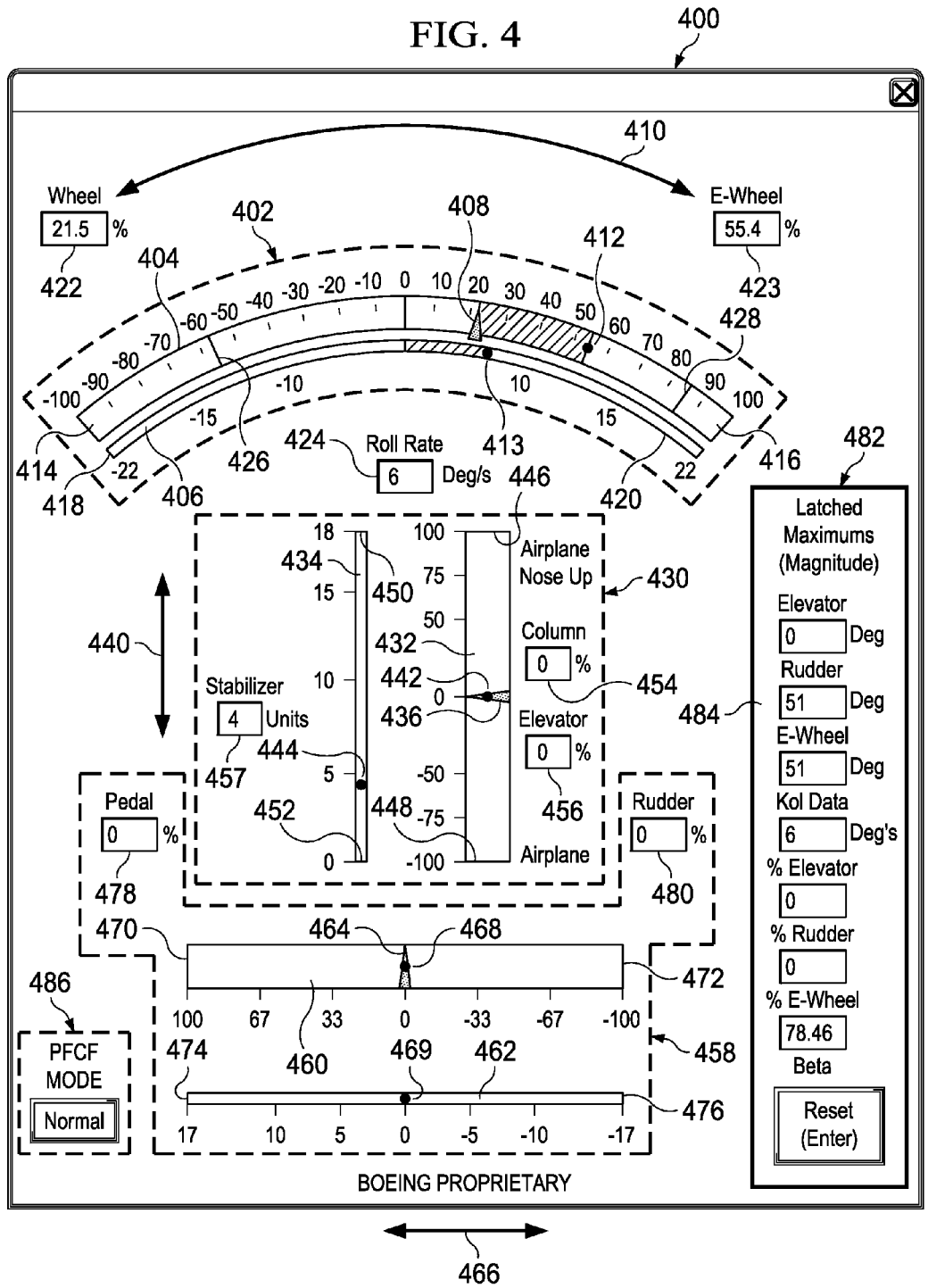
FIG. 4 is an illustration of a graphical user interface in accordance with an illustrative embodiment.

Turning now to FIG. 4, an illustration of a graphical user interface is depicted in accordance with an illustrative embodiment. In this illustrative example, graphical user interface 400 is an example of one implementation for graphical user interface 236 in FIG. 2.

In this illustrative example, the response of control surface system 206 may be displayed in graphical user interface 236 in these illustrative examples. As depicted, roll section 402 displays information about a roll rate for a roll control surface system.

In these depicted examples, wheel input 404 is a graphical element indicating a pilot control input signal that may be generated by turning a control in the form of a wheel in the cockpit of the aircraft. Roll rate 406 is a graphical element indicating the aircraft roll rate. The roll rate for the aircraft may be displayed in roll rate 406 as a function of a wheel input command in roll section 402. In this example, wheel input 404 and roll rate 406 are shown as circumferential sections. In other words, these two graphical elements are shown as being arcs or curves that may be part of a circle and may form a circumference display.

In roll section 402, indicator 408 is a graphical element that indicates the roll control input generated by the pilot. In this example, the control input is input of the wheel that may be manipulated by the pilot.

As depicted, indicator 408 may move in the direction of arrow 410. This movement of indicator 408 is within wheel input 404.

Indicator 412 in roll section 402 is a graphical element that indicates the command generated in response to the control input generated by the pilot manipulating the control in this illustrative example. As depicted, indicator 412 also may move within wheel input 404 in the direction of arrow 410.

Indicator 413 is a graphical element that indicates the roll rate that occurs as a result of the command indicated by indicator 412 and other external forces on the aircraft. In these depicted examples, indicator 413 is configured to move within roll rate 406 in the direction of arrow 410.

As illustrated, limits for wheel input 404 and roll rate 406 are indicated by the ends of these graphical elements. These ends are examples of saturation limits for a roll control surface system. In this illustrative example, each end represents a saturation limit for the roll control surface system. The limit may be for one or more control surfaces in the roll control surface system.

For example, end 414 and end 416 of wheel input 404 indicate the limits of movement for the roll control surface system based on the input for the wheel when manipulated by the pilot and the command generated by the control system in response to the pilot control input signal. As another example, end 418 and end 420 indicate the limits of the commanded roll rate that may be generated by the roll control surface system.

In these illustrative examples, these ends represent the saturation for control surfaces. In these examples, saturation is the point at which any additional input from the pilot does not affect the movement of a control surface. In this manner, the ends of a section represent saturation points. An alert may occur when the control surface moves within a percentage of this saturation. The percentage at which the alert is generated may be configured in these illustrative examples.

As depicted, wheel input 404 is displayed with modified values. In other words, actual values or positions are not used. Instead, a range is shown from negative 100 percent to positive 100 percent. Thus, if the saturation limits change, end 414 and end 416 may not change position. Instead, indicator 408 and indicator 412 may be repositioned within wheel input 404. In this manner, limits to the movement of a control surface generated by control laws in a control system may be taken into account in the display of wheel input 404. By not changing the display of wheel input 404 in response to changes in the saturation limits, less distraction may occur with respect to an operator using graphical user interface 400.

In this example, field 422 is a graphical element. Field 422 provides a numerical value for the wheel input indicated by indicator 408. Field 423 is a graphical element that displays a numerical value for the wheel input commanded by the control system as shown by indicator 412. As depicted, field 424 is a graphical element that displays numerical value for the roll rate indicated by indicator 413.

Latch 426 and latch 428 are graphical elements that show a maximum in the negative direction and in the positive direction, respectively, for commands generated by the control system. In this manner, a pilot may be able to see the largest negative value indicated by latch 426 and the largest positive value indicated by latch 428. Of course, these latches may be reset after at least one of a period of time, operator input, and in response to some other event.

Graphical user interface 400 also includes pitch section 430. As depicted, pitch section 430 provides information about the pitch of an aircraft for a pitch control surface system. The pitch control surface system may be a group of elevators for the aircraft.

In this illustrative example, pitch section 430 includes graphical elements in the form of column input 432, stabilizer position 434, indicator 442 in column input 432, and indicator 444 in stabilizer position 434. In this example, column input 432 is displayed using modified values. These values may be modified based on a predetermined range. In some examples, an angle of attack for the aircraft may be displayed in pitch section 430. In these depicted examples, indicator 436 may represent column input, indicator 442 represents elevator position and indicator 444 represents stabilizer position.

As depicted, indicator 436 is a graphical element that indicates the pilot control input signal generated by the pilot manipulating the control in the form of a column. In this illustrative example, indicator 436 also may move within column input 432 in the direction of arrow 440.

Indicator 442 in column input 432 is a graphical element that indicates the elevator command generated in response to the pilot control input signal generated by the pilot manipulating the column in this illustrative example. In other words, indicator 442 indicates elevator position. In this illustration, indicator 442 also may move within column input 432 in the direction of arrow 440.

Indicator 444 is a graphical element that indicates the stabilizer position that occurs as a result of the control system command indicated by indicator 442. As depicted, indicator 444 is configured to move within stabilizer position 434 in the direction of arrow 440.

In these illustrative examples, the control system command may cause at least one of the elevator command and the stabilizer command. As a result, at least one of indicator 442 corresponding to the elevator command and indicator 444 corresponding to the stabilizer command may move in the direction of arrow 440. The threshold limits of the elevator and the stabilizer may be different in these illustrative examples.

As depicted, limits for column input 432 and stabilizer position 434 are indicated by the ends of these graphical elements. For example, end 446 and end 448 of column input 432 indicate the limits of movement for the column when manipulated by the pilot and as commanded by the control system. In other words, end 446 and end 448 of column input 432 indicate the limits that the elevator may be moved in the longitudinal control surface. As another example, end 450 and end 452 indicate the limits that the stabilizer may be moved in the longitudinal control surface system.

In this illustrative example, pitch section 430 also includes field 454, field 456, and field 457. Field 454 displays a numerical value for the column input as indicated by indicator 436. Field 456 displays an elevator position. These fields display modified values as a normalized value in the form of a percentage based on a predetermined range. Field 457 displays the stabilizer position in degrees.

In this illustrative example, graphical user interface 400 also includes pedal section 458. As depicted, pedal section 458 provides information about the yaw of an aircraft for a yaw control surface system. The yaw control surface system may be the rudder for the aircraft. For example, pedal section 458 may display a level of saturation for a yaw control surface.

Pedal section 458 includes graphical elements in the form of pedal input 460, rudder position 468, and yaw angle position 462. Pedal input 460 and rudder position 468 are also displayed with modified values. In these illustrative examples, a slideslip (yaw angle) for the aircraft as a function of pedal input 460 may be displayed in pedal section 458.

As depicted, indicator 464 is a graphical element that indicates the pilot control input signal generated by the pilot manipulating the control in the form of a pedal. In these illustrative examples, indicator 464 may move within pedal input 460 in the direction of arrow 466.

Indicator 464 in pedal input 460 is a graphical element that indicates the rudder deflection command generated in response to the control input by the pilot manipulating the pedal in this illustrative example. In these illustrative examples, indicator 464 also may move within pedal input 460 in the direction of arrow 466.

Indicator 469 is a graphical element that indicates the yaw angle of the aircraft that occurs as a result of the command indicated by indicator 464. As depicted, indicator 469 is configured to move within yaw angle position 462 in the direction of arrow 466.

In this depicted example, limits for pedal input 460 and yaw angle position 462 are indicated by the ends of these graphical elements. For example, end 470 and end 472 of pedal input 460 indicate the limits of movement for the pedal when manipulated by the pilot and rudder deflection as commanded by the control system. As another example, end 474 and end 476 indicate the limits of the yaw angle position that may be commanded by the yaw control surface system.

In these illustrative examples, window 478 displays a value for pedal input 460. This value is the pedal input by the pilot in this illustrative example. Window 480 displays a value for the position of the rudder as indicated by indicator 464 in rudder position 468.

In this illustrative example, latch information section 482 includes windows 484. Windows 484 are configured to display maximum and minimum values in addition to or in place of an indication of these values using graphical elements.

Additionally, graphical user interface 400 also includes mode section 486. Mode section 486 indicates the mode in which control laws are operating for the aircraft. In these illustrative examples, mode section 486 provides situational awareness for the user. For example, when the aircraft is in normal flight control mode, the graphical depictions are accurate. When the aircraft is operating in a non-normal flight control mode, mode section 486 may blink or otherwise indicate that the normalization assumptions are invalid and the data are no longer valid.

Further, data integrity is continuously monitored and indicated in each section of graphical user interface 400. For example, if the roll control and roll control surface data are determined to be invalid, then the circumferential sector display of wheel input 404 may be displayed in muted grey. As another example, if airspeed is determined to be invalid and airspeed is used as an input to determine the normalization of control surface position, then the normalization of control surface position is known to be invalid and the display that represents the normalized control surface position may be displayed in muted grey. In this instance, column input 432, wheel input 404, or pedal input 460 may be displayed in muted grey. Of course, data integrity may be indicated in other ways, depending on the particular implementation.

Figure 5:
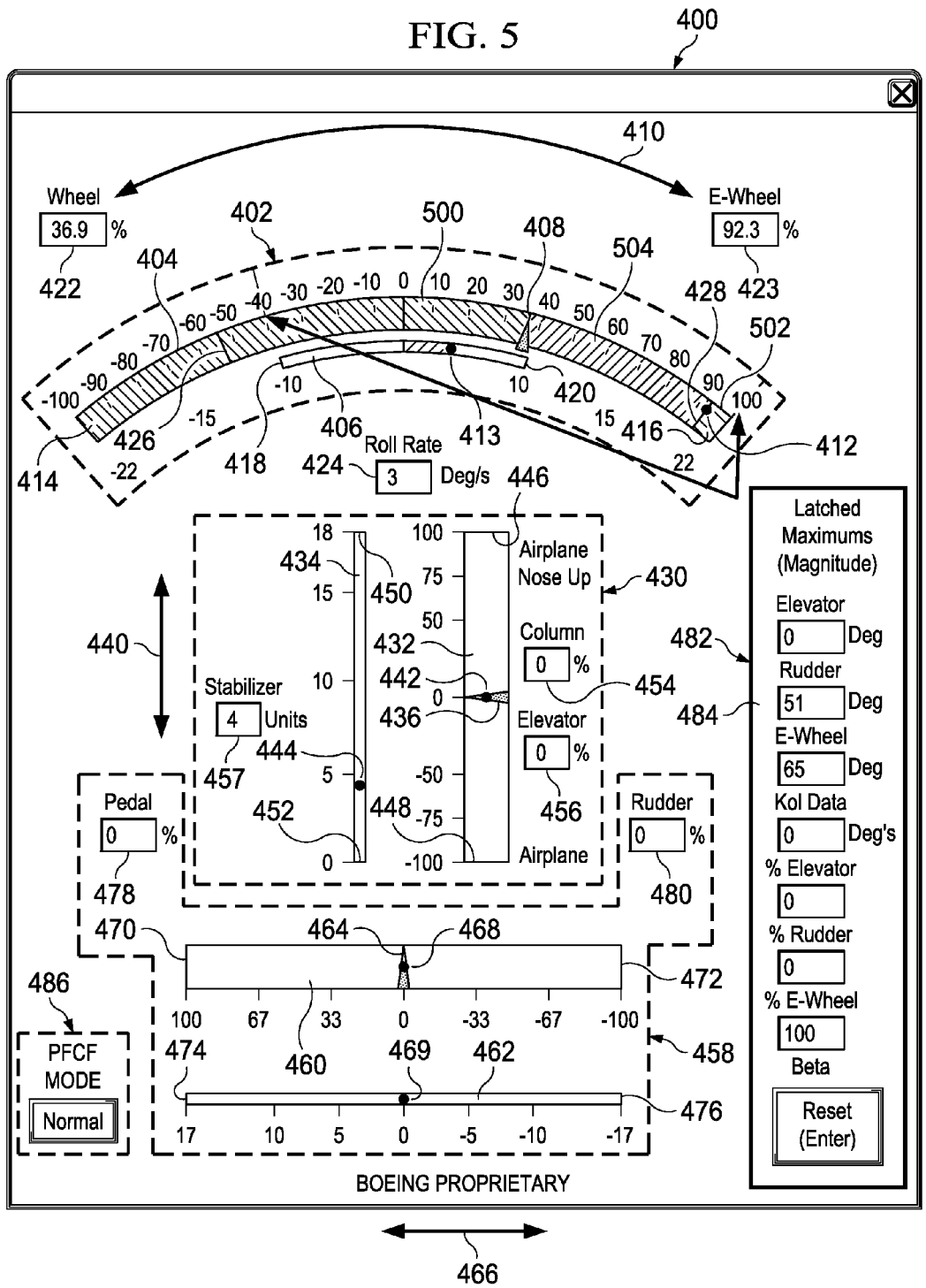
FIG. 5 is an illustration of lateral saturation in accordance with an illustrative embodiment.

Turning next to FIG. 5, an illustration of lateral saturation is depicted in accordance with an illustrative embodiment. A level of saturation for a roll control surface is depicted in this example. Further, an indication of the roll control surface system approaching a threshold is illustrated in this figure.

In this illustrative example, saturation indicator 500 and saturation indicator 502 are displayed in wheel input 404 within roll section 402. Saturation indicator 500 and saturation indicator 502 are graphical elements that provide a warning when a threshold is reached, exceeded, or both with respect to saturation of the roll control surface system in this depicted example. These saturation indicators may indicate when lateral saturation is nearing or has occurred for the aircraft.

In this illustrative example, saturation indicator 500 is a segment that extends from end 414 of wheel input 404 to indicator 408. Saturation indicator 502 is a segment that extends from end 416 of wheel input 404 to indicator 412. As depicted, saturation indicator 500 and saturation indicator 502 may have a color such as yellow. Although these two indicators are shown having the same color, they may have different colors from each other in other illustrative examples.

Further, in yet other illustrative examples, these saturation indicators may take other forms. These other forms may be, for example, at least one of other colors, an icon, a flashing color, a text, a pop-up window, or some other suitable type of indicator that may obtain the attention of an operator.

In this particular example, saturation indicator 500 is displayed when indicator 408 for the pilot control input signal generated by the wheel is greater than 80 percent. In a similar fashion, saturation indicator 502 is also displayed when indicator 412 for the command generated is greater than 80 percent. Of course, other thresholds may be used depending on the particular implementation. For example, other thresholds may be 75 percent, 90 percent, or some other suitable percentage desired for a particular test flight.

Graphical user interface 400 also includes difference indicator 504 in wheel input 404. Difference indicator 504 is a graphical element that is in the form of a segment extending between the pilot control input signal identified by indicator 408 and the command identified by indicator 412. Difference indicator 504 is configured to provide a graphical indication of the difference between the pilot control input signal and the command. In this illustrative example, difference indicator 504 may be a color such as magenta. Of course, other colors and other types of graphics may be used for difference indicator 504, depending on the particular implementation.

Figure 6:
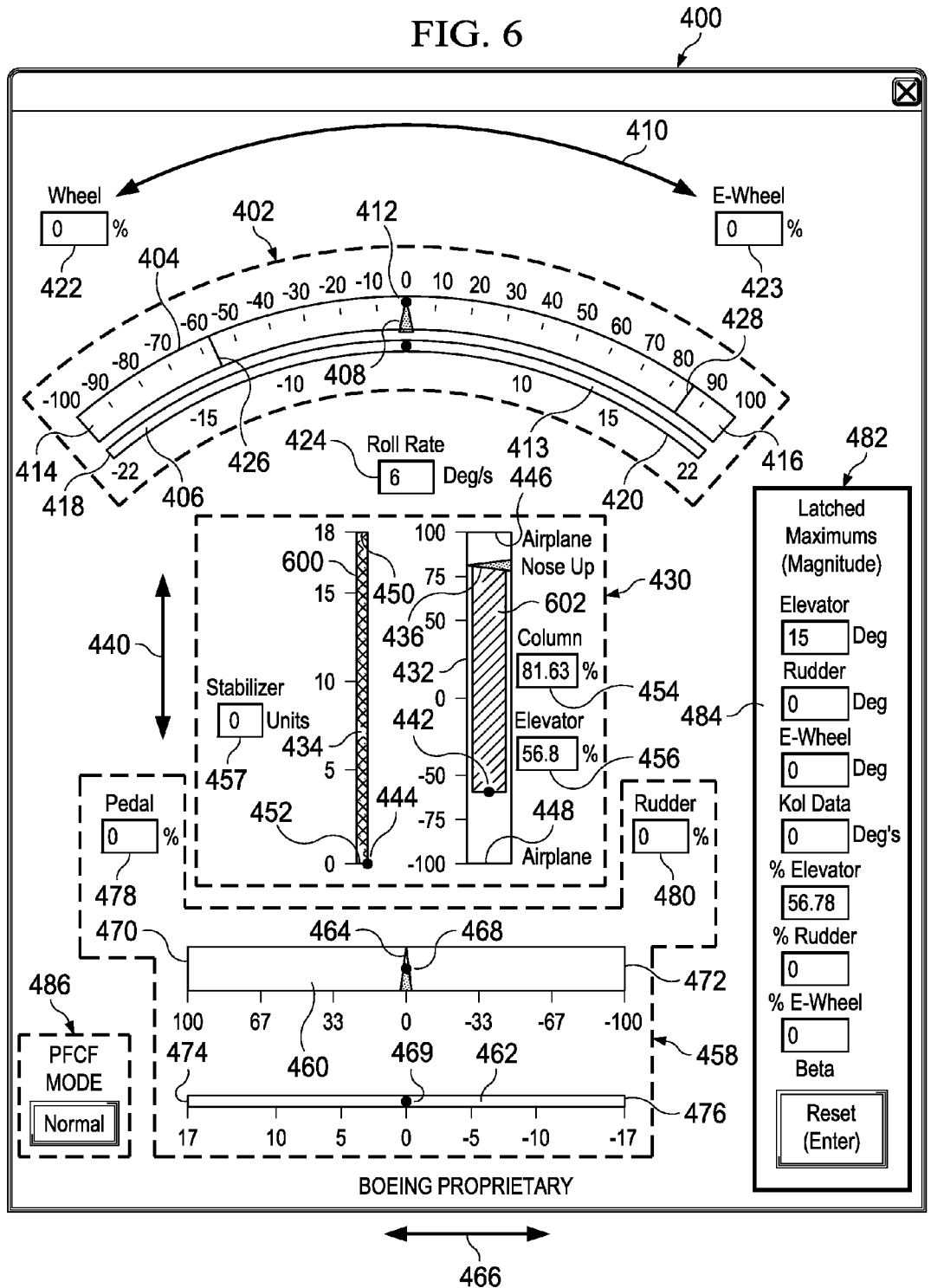
FIG. 6 is an illustration of longitudinal saturation in accordance with an illustrative embodiment.

Turning now to FIG. 6, an illustration of longitudinal saturation is depicted in accordance with an illustrative embodiment. In this illustrative example, graphical user interface 400 displays a level of saturation for a pitch control surface. Further, an indication of the pitch control surface system approaching a threshold is illustrated in this figure. As depicted, graphical user interface 400 includes saturation indicator 600 in stabilizer position 434. As depicted, saturation indicator 600 is a graphical element that takes the form of a segment that extends from end 450 to include indicator 444 having the color yellow.

Saturation indicator 600 is displayed when the stabilizer position is greater than 80 percent as indicated by indicator 444 in stabilizer position 434. In this particular example, saturation indicator 600 and the position of indicator 444 in stabilizer position 434 indicate that the pitch control surface system is in a full nose down configuration.

In this example, the position of the stabilizer in stabilizer position 434 is not shown as being modified based on the predetermined range. Instead, values for the stabilizer position are displayed. In this illustrative example, 80 percent may be a movement of the stabilizer to less than one or greater than 15 degrees.

In this illustrative example, difference indicator 602 is a graphical element in the form of a segment that extends from indicator 436 for the pilot control input signal to indicator 442 for the elevator command by the control system. In this example, difference indicator 602 includes the color magenta.

Figure 7:
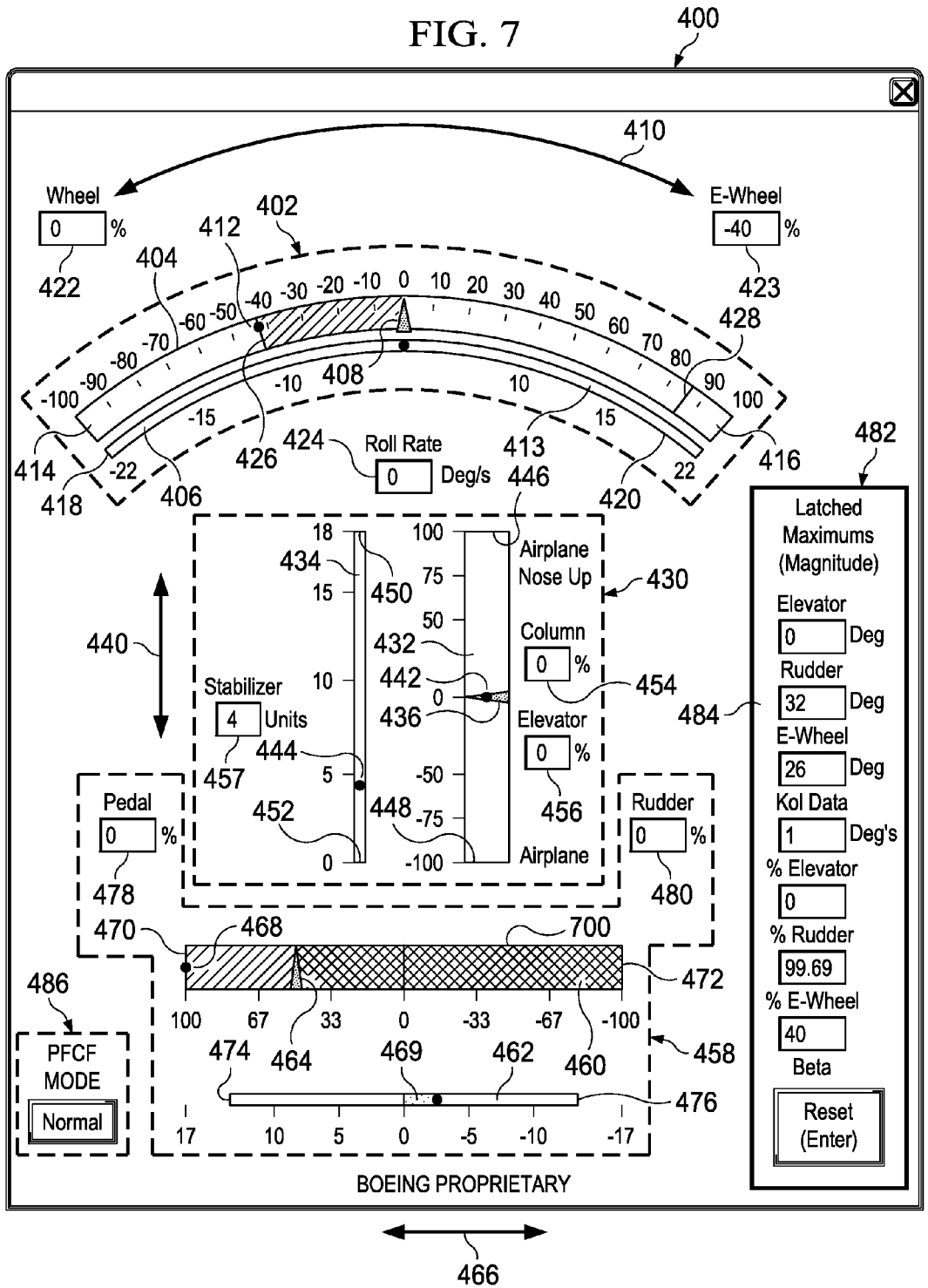
FIG. 7 is an illustration of directional saturation in accordance with an illustrative embodiment.

Turning next to FIG. 7, an illustration of directional saturation is depicted in accordance with an illustrative embodiment. As depicted, saturation indicator 700 is displayed in pedal input 460. Saturation indicator 700 is a graphical element that includes the color yellow. Saturation indicator 700 is displayed when the pilot control input signal indicates that the pilot has moved the pedals greater than 80 percent. In this illustrative example, saturation indicator 700 is a segment that extends from end 472 of pedal input 460 to indicator 464 that shows the pilot control input signal. In this illustrative example, saturation indicator 700 is displayed when the pilot control input signal is indicating that the rudder pedal has been commanded more than 80 percent of its possible movement.

In this manner, graphical user interface 400 in FIGS. 4-7 provides an operator, such as a pilot, an ability to determine when a control surface system has reached or exceeded a desired level of saturation. In this example, various indicators are used to graphically display information about the pilot control input signal generated by the manipulation from a control in comparison with the command generated by the control system. Further, graphical user interface 400 provides increased situational awareness to the pilot with respect to when a threshold limit has been reached or exceeded.

By indicating the actual command generated from the pilot input control signal, graphical user interface 400 may allow a pilot to operate the aircraft such that a control surface system stays within a particular limit. In this manner, the performance of the aircraft may be evaluated and a determination may be made as to whether the limit should be changed. For example, during testing of the aircraft, a determination may be made to alter the limits to other limits in a series of limits for the control surface system.

The illustration of graphical user interface 400 in FIGS. 4-7 is only meant to show one example for graphical user interface 236 that may be displayed on display system 238 in FIG. 2. The illustrations are not meant to limit the manner in which other graphical user interfaces may be implemented. For example, in other illustrative examples, windows for displaying numerical values may be omitted.

As another example, graphical user interface 400 may display sections or windows for other control surface systems other than the ones shown in FIGS. 4-7. In yet other illustrative examples, only a single control surface system may be displayed or other types of control surface systems may be displayed in addition to or in place of ones depicted in graphical user interface 400.

Figure 8:
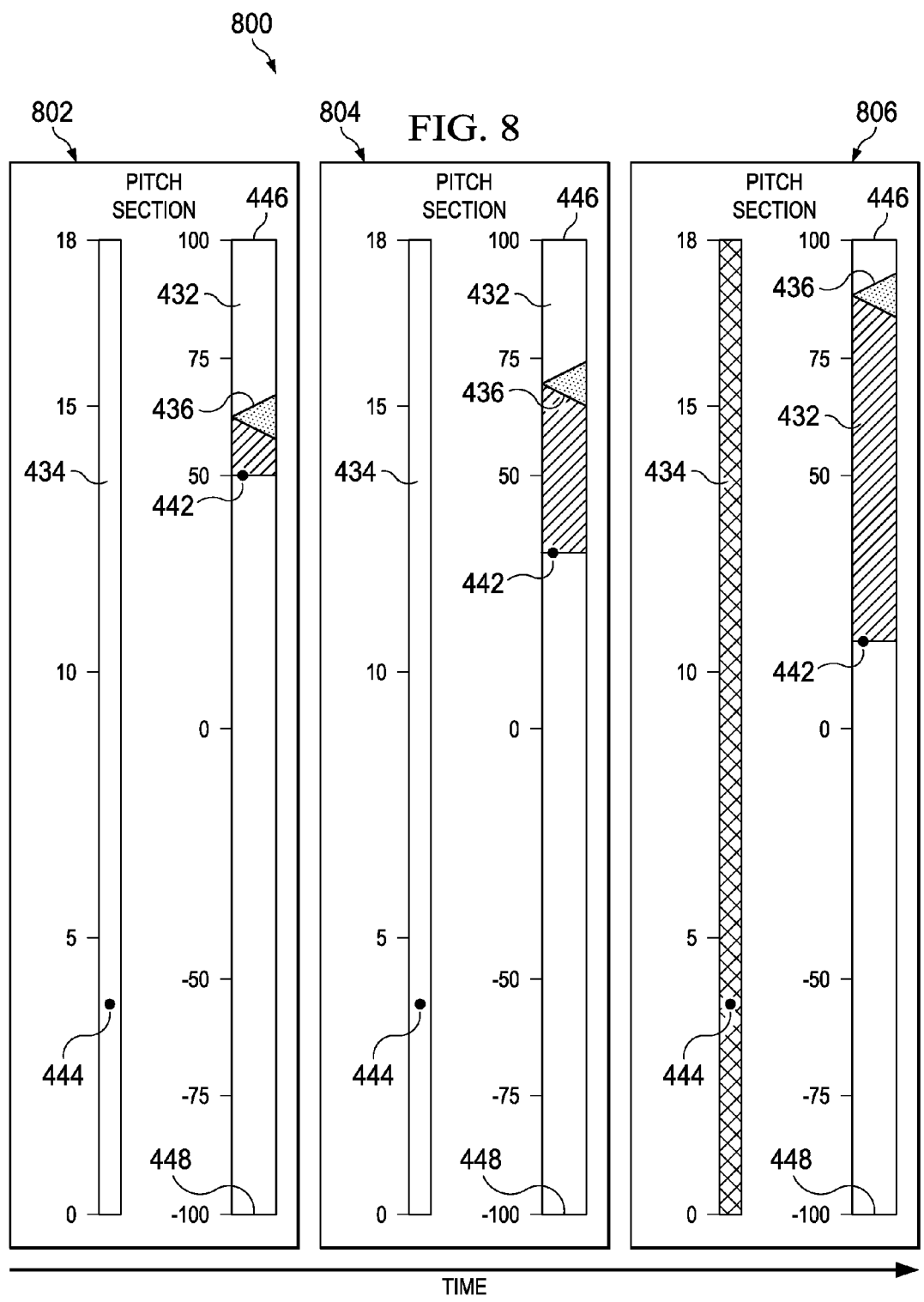
FIG. 8 is an illustration of graphical user interface elements for pitch control over time in accordance with an illustrative embodiment.

Turning now to FIG. 8, an illustration of graphical user interface elements for pitch control over time is depicted in accordance with an illustrative embodiment. In this illustrative example, diagrams 800 include examples of pitch section 430 in FIG. 4 over time as depicted by pitch section 802, pitch section 804, and pitch section 806.

As depicted, diagrams 800 illustrate the modification of a display of the response of the control surface system based on a range for the position of a control surface prior to displaying the response on the graphical user interface. In this depicted example, pitch section 802, pitch section 804, and pitch section 806 provide information about the pitch of an aircraft for a pitch control surface system. For example, diagrams 800 may provide information about the pitch of aircraft 100 in FIG. 1 in these illustrative examples. In this illustration, pitch section 802, pitch section 804, and pitch section 806 include graphical elements displayed in column input 432 representing elevator position and stabilizer position 434 representing stabilizer position.

In this depicted example, at each point in time when pitch section 802, pitch section 804, and pitch section 806 are displayed, a process determines values for end 446 and end 448 of column input 432 that indicate the current limits of movement for the column. For example, the values for end 446 and end 448 may be identified based on a current configuration of the aircraft and current flight conditions. For example, the aircraft configuration may include flap setting, gear position, and other suitable aircraft configuration components. Further, the flight conditions may include airspeed, Mach number, altitude, and other suitable flight conditions.

In this example, the values for end 446 and end 448 identify a range of values for the graphical elements of column input 432. Column input 432 displays the range of values as positive 100 to negative 100. However, the range of values used to identify where to display indicator 436 and indicator 442 on column input 432 is the range of values for end 446 and end 448. For example, the value for end 446 is shown as 100 even though the actual value for end 446 may be a different value for each indicator.

Another process identifies a value for indicator 442 and a value for indicator 436. In these illustrative examples, the value for indicator 442 and the value for indicator 436 are used to determine where indicator 442 and indicator 436 are displayed within the range of values between end 446 and end 448.

In this illustrative example, values for end 446 and end 448 change over time between pitch section 802, pitch section 804, and pitch section 806. In this example, the pilot has not made any changes to the controls, however, the current aircraft configuration and/or flight conditions change over time resulting in new values for end 446 and end 448 in pitch section 804 and pitch section 806. In this instance, the values for end 446 and end 448 result in a smaller range of values between end 446 and end 448 over time.

As depicted, the value for end 446 in pitch section 806 results in the location of indicator 444 exceeding a threshold for saturation. In response to the location of indicator 444 exceeding the threshold for saturation, stabilizer position 434 displays an indication of the threshold for saturation being reached. In other words, stabilizer position 434 indicates that the threshold for saturation of stabilizer input has been reached. In this example, the indication of the threshold for saturation being reached is shown by cross hatching in the display of stabilizer position 434.

Figure 9:
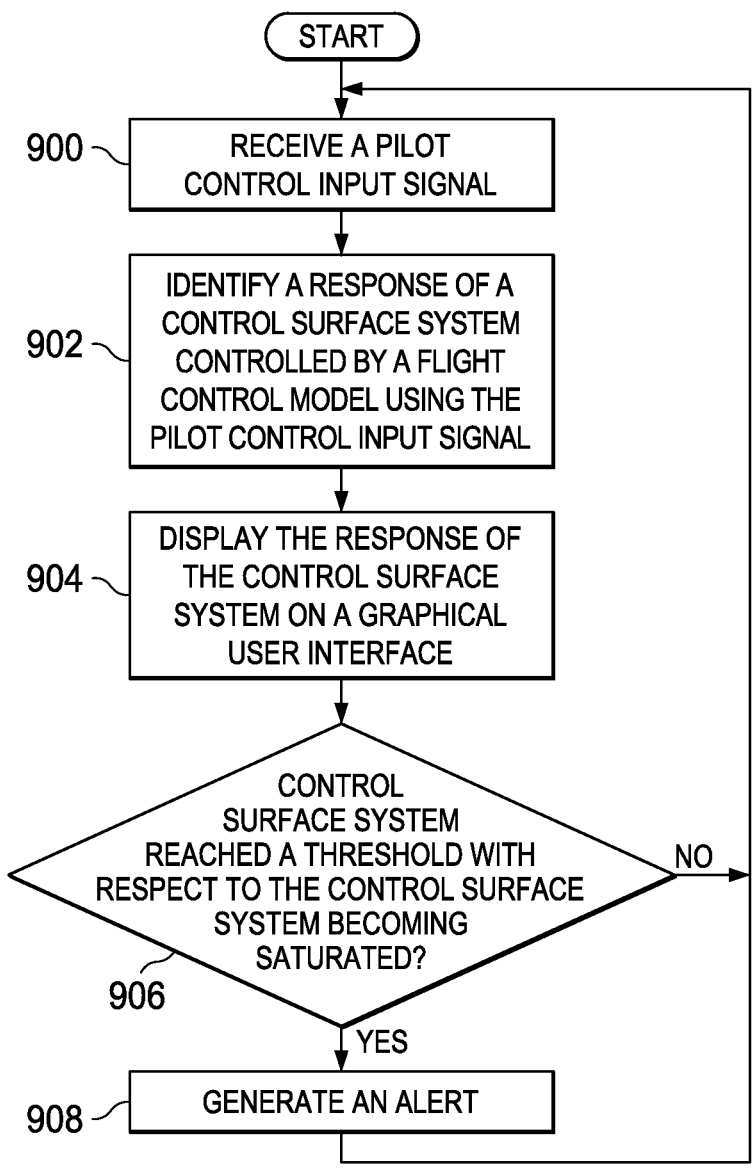
FIG. 9 is an illustration of a flowchart of a process for monitoring a fly-by-wire aircraft in accordance with an illustrative embodiment.

Turning next to FIG. 9, an illustration of a flowchart of a process for monitoring a fly-by-wire aircraft is depicted in accordance with an illustrative embodiment. The process illustrated in FIG. 9 may be implemented using flight monitor 204 to monitor aircraft 202 in aircraft monitoring environment 200 in FIG. 2.

The process begins by receiving a pilot control input signal (operation 900). Thereafter, a response of a control surface system controlled by a flight control model is identified using the pilot control input signal (operation 902). In this illustrative example, flight control model 230 in FIG. 2 may control the operation of control surface system 206 when used by control system 218.

The process then displays the response of the control surface system on a graphical user interface (operation 904). Next, a determination is made as to whether the control surface system has reached a threshold with respect to the control surface system becoming saturated (operation 906). If the control surface system has reached the threshold, an alert is generated (operation 908), and the process returns to operation 900 as described herein. The alert may take various forms. For example, the alert may be at least one of graphical alert 242, audio alert 244, tactile alert 246, or other suitable types of alerts. With reference again to operation 906, if the control surface system has not reached the threshold, the process returns to operation 900.

Figure 10:
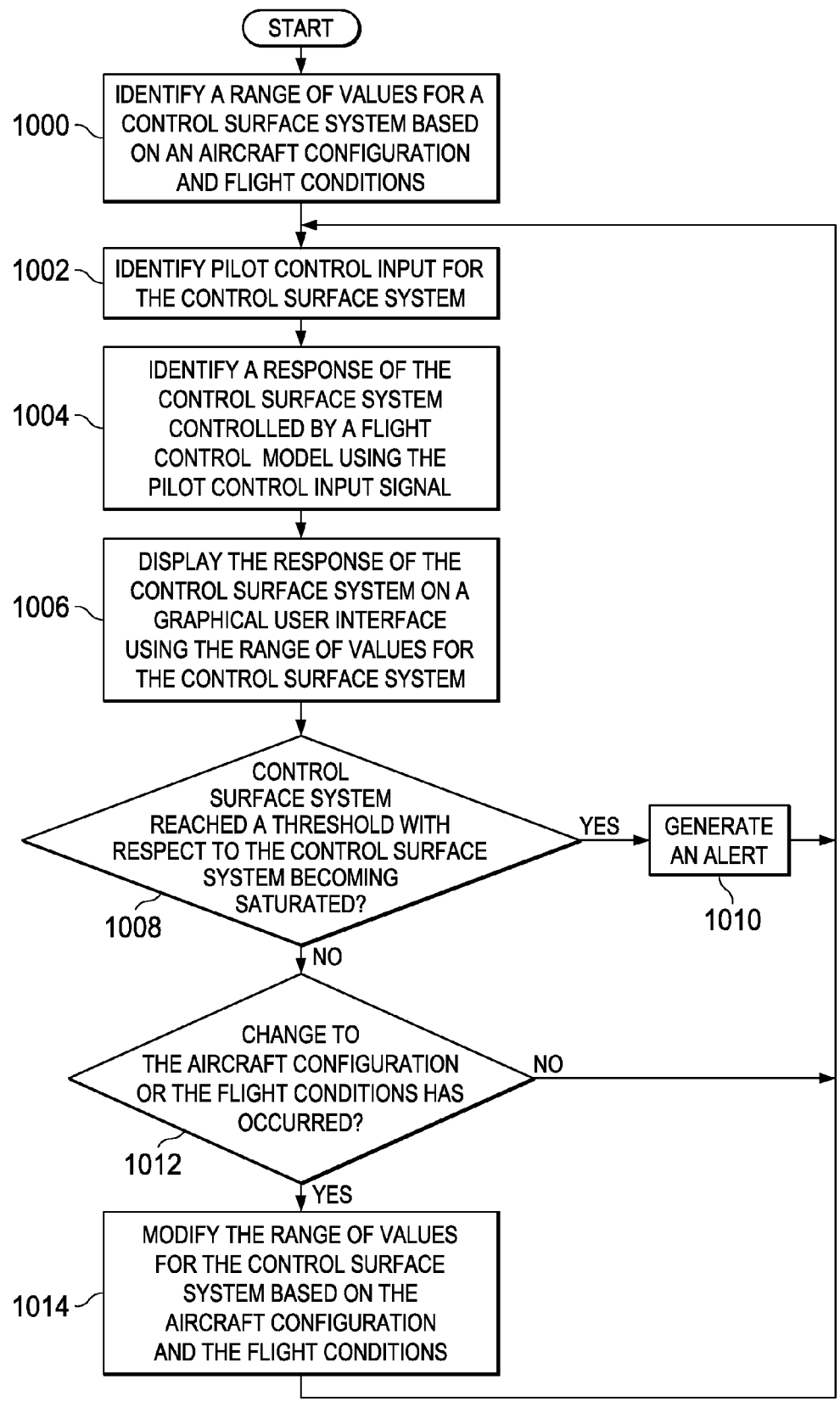
FIG. 10 is another illustration of a flowchart of a process for monitoring a fly-by-wire aircraft in accordance with an illustrative embodiment.

Turning next to FIG. 10, another illustration of a flowchart of a process for monitoring a fly-by-wire aircraft is depicted in accordance with an illustrative embodiment. The process illustrated in FIG. 10 may be implemented using flight monitor 204 to monitor aircraft 202 in aircraft monitoring environment 200 in FIG. 2.

The process begins by identifying a range of values for a control surface system based on an aircraft configuration and flight conditions (operation 1000). The process next identifies pilot control input for the control surface system (operation 1002). In this illustrative example, flight control model 230 in FIG. 2 may control the operation of control surface system 206 when used by control system 218.

The process then identifies a response of the control surface system controlled by a flight control model using the pilot control input signal (operation 1004). Next, the process displays the response of the control surface system on a graphical user interface using the range of values for the control surface system (operation 1006).

A determination is made as to whether the control surface system has reached a threshold with respect to the control surface system becoming saturated (operation 1008). If the control surface system has reached the threshold, an alert is generated (operation 1010) with the process returning to operation 1002 as described herein. The alert may take various forms. For example, the alert may be at least one of graphical alert 242, audio alert 244, tactile alert 246, or other suitable types of alerts.

With reference again to operation 1008, if the control surface system has not reached the threshold, the process determines whether a change to the aircraft configuration or flight conditions has occurred (operation 1012). If a change to the aircraft configuration or the flight conditions has not occurred the process returns to operation 1002. Otherwise, the process modifies the range of values for the control surface system based on the aircraft configuration and the flight conditions (operation 1014) with the process then returning to operation 1002 thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the different operations illustrated in FIG. 9 and FIG. 10 may be repeated any number of times for different control surface systems. Additionally, the display of the response of the control surface system on the graphical user interface may be performed for any control surface systems of interest.

Turning now to FIG. 11, an illustration of a block diagram of a data processing system is depicted in accordance with an illustrative embodiment. Data processing system 1100 may be used to implement one or computers in computer system 208 in FIG. 2. In this illustrative example, data processing system 1100 includes communications framework 1102 which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Memory 1106 may be a random access memory or any other suitable volatile or non-volatile storage device in these illustrative examples.

Persistent storage 1108 may take various forms, depending on the particular implementation. For example, persistent storage 1108 may contain one or more components or devices. For example, persistent storage 1108 may be a hard drive, a flash memory, a rewritable optical disk, a rewritable magnetic tape, or some combination of the above.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code 1118.

In particular, one or more illustrative examples display information in a manner that allows a pilot or other operator of an aircraft to recognize when saturation of the control surface system may be approaching or imminent. In this manner, the illustrative embodiments provide a pilot a mechanism to avoid undesired aircraft performance that may occur when saturation is present for a control surface system. The graphical user interface in these illustrative examples may function as a control limit indication facilitator to convey information about limits that may be reached with respect to control surfaces on an aircraft.

The descriptions of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring an aircraft (202), the method comprising:
   receiving a pilot control input signal (224);
   identifying a response of a control surface system (206) controlled by a flight control model (230) using the pilot control input signal (224);

generating an alert (240) when the control surface system (206) reaches a threshold (241) with respect to the control surface system (206) becoming saturated; and displaying, via a first indicator (408, 436, or 464) on a graphical user interface (236), the pilot control input signal (224);

displaying, via a second indicator (412) on the graphical user interface (236), a command sent to the control surface system (206) in response to the pilot control input signal (224); and displaying, via a third indicator (442, 468, or 444) on the graphical user interface (236), the response of the control surface system (206) to the command.

2. The method of claim 1 further comprising:

modifying a display of the response of the control surface system (206) based on a range for a position of a control surface prior to displaying the response on the graphical user interface (236);

wherein the pilot control input signal (224) is displayed via a first graphical element (408, 436, or 464) and a second graphical element (422, 454, or 478) and the second graphical element (422, 454, or 478) displays the pilot control input signal (224) as a numerical value; and wherein the command is displayed via a third graphical element (412, 442, 444, or 468) and a fourth graphical element (423, 456, 457, and 480) and the fourth graphical element (423, 456, 457, and 480) displays the command as a numerical value.

3. The method of claim 1 further comprising:
displaying a level of saturation (310) for a roll control surface.

4. The method of claim 1 further comprising:
displaying a level of saturation (310) for a yaw control surface.

5. The method of claim 1 further comprising:
displaying a level of saturation (310) for a pitch control surface.

6. The method of claim 1 further comprising:
modifying a display of the response based on a range for a position of a control surface.

7. The method of claim 1 further comprising:
displaying an indication of the control surface system (206) approaching the threshold (241).

8. The method of claim 1 further comprising:
displaying a roll rate (406) for the aircraft (202) as a function of a wheel input command in a circumference display.

9. The method of claim 1 further comprising:
displaying an angle of attack for the aircraft (202) correlating to a column input (432).

10. The method of claim 1 further comprising:
displaying a slideslip for the aircraft (202) correlating to a pedal input (460).

11. The method of claim 1, wherein the pilot control input signal (224) is generated by a control (212) located in one of the aircraft (202) and a simulator for the aircraft (202).

12. The method of claim 1, wherein the aircraft (202) is a fly-by-wire aircraft (216).

13. A method for monitoring an aircraft (202), the method comprising:

receiving a pilot control input signal (224);
identifying a response of a control surface system (206) controlled by a flight control model (230) using the pilot control input signal (224);
modifying a display of the response of the control surface system (206) based on a range for a position of the control surface system (206);

displaying, via a first indicator (408, 436, or 464) on a graphical user interface (236), the pilot control input signal (224);

displaying, via a second indicator (412) on the graphical user interface (236), a command sent to the control surface system (206) in response to the pilot control input signal (224); and displaying, via a third indicator (442, 468, or 444) on the graphical user interface (236), the response of the control surface system (206) to the command.

14. The method of claim 13 further comprising:

generating an alert (240) as the response indicates that the control surface system (206) is approaching a full deflection capability for the control surface system (206);

wherein the pilot control input signal (224) is displayed via a first graphical element (408, 436, or 464) and a second graphical element (422, 454, or 478) and the second graphical element (422, 454, or 478) displays the pilot control input signal (224) as a numerical value; and wherein the command is displayed via a third graphical element (412, 442, 444, or 468) and a fourth graphical element (423, 456, 457, and 480) and the fourth graphical element (423, 456, 457, and 480) displays the command as a numerical value.

15. An apparatus comprising:
a flight monitor (204) configured to:
receive a pilot control input signal (224) for an aircraft (202);
identify a response of a control surface system (206) controlled by a flight control model (230) using the pilot control input signal (224);
generate an alert (240) when the control surface system (206) reaches a threshold (241) with respect to the control surface system (206) becoming saturated;
display, via a first indicator (408, 436, or 464) on a graphical user interface (236), the pilot control input signal (224);
display, via a second indicator (412) on the graphical user interface (236), a command sent to the control surface system (206) in response to the pilot control input signal (224); and
display, via a third indicator (442, 468, or 444) on the graphical user interface (236), the response of the control surface system (206).

16. The apparatus of claim 15,
wherein the aircraft (202) is a fly-by-wire aircraft (216).

17. The apparatus of claim 16, wherein the flight monitor (204) is further configured to modify a display of the response of the control surface system (206) based on a range for a position of a control surface prior to displaying the response on the graphical user interface (236);

wherein the pilot control input signal (224) is displayed via a first graphical element (408, 436, or 464) and a second graphical element (422, 454, or 478) and the second graphical element (422, 454, or 478) displays the pilot control input signal (224) as a numerical value; and wherein the command is displayed via a third graphical element (412, 442, 444, or 468) and a fourth graphical element (423, 456, 457, and 480) and the fourth graphical element (423, 456, 457, and 480) displays the command as a numerical value.

18. The apparatus of claim 15, wherein the flight monitor (204) is further configured to display a level of saturation (310) for a roll control surface.

19. The apparatus of claim 15, wherein the flight monitor (204) is further configured to display a level of saturation (310) for a yaw control surface.

20. The apparatus of claim 15, wherein the flight monitor (204) is further configured to display a level of saturation (310) for of a pitch control surface.

21. The apparatus of claim 15, wherein the flight monitor (204) is further configured to display an indication of the control surface system (206) approaching the threshold (241).

22. The apparatus of claim 15, wherein the flight monitor (204) is further configured to display a roll rate (406) for the aircraft (202) correlating to a wheel input command in a circumference display.

23. The apparatus of claim 15, wherein the flight monitor (204) is further configured to display an angle of attack for the aircraft (202) as a function of a column input (432).

24. The apparatus of claim 15, wherein the flight monitor (204) is further configured to display a slideslip for the aircraft (202) as a function of a pedal input (460).

25. The apparatus of claim 15, wherein the pilot control input signal (224) is generated by a control (212) located in one of the aircraft (202) and a simulator for the aircraft (202).

26. An apparatus comprising:
a flight monitor (204) configured to:
receive a pilot control input signal (224) for an aircraft (202);
identify a response of a control surface system (206) controlled by a flight control model (230) using the pilot control input signal (224);
modify a display of the response of the control surface system (206) based on a range for a position of a control surface;
display, via a first indicator (408, 436, or 464) on a graphical user interface (236), the pilot control input signal (224);
display, via a second indicator (412) on the graphical user interface (236), a command sent to the control surface system (206) in response to the pilot control input signal (224); and
display, via a third indicator (442, 468, or 444) on the graphical user interface, the response of the control surface system (206) to the command.

27. The apparatus of claim 26, wherein the flight monitor (204) is further configured to:
generate an alert (240) as the response indicated that the control surface system (206) is approaching a saturation limit for the control surface system (206);
wherein the pilot control input signal (224) is displayed via a first graphical element (408, 436, or 464) and a second graphical element (422, 454, or 478) and the second graphical element (422, 454, or 478) displays the pilot control input signal (224) as a numerical value; and
wherein the command is displayed via a third graphical element (412, 442, 468, or 444) and a fourth graphical element (423, 456, 457, and 480) and the fourth graphical element (423, 456, 457, and 480) displays the command as a numerical value.

* * * * *